J ADAMS.
Flower Vase.
No. 1,761. Patented Sept. 3, 1840.
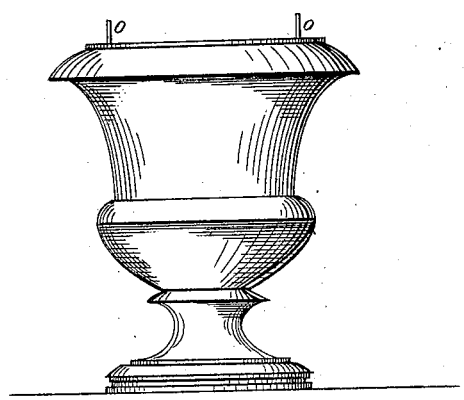
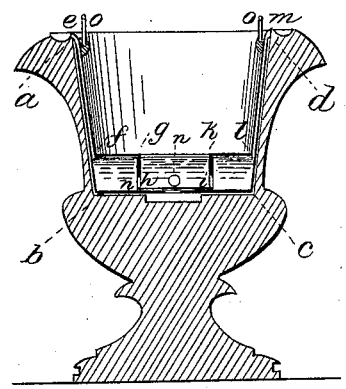

UNITED STATES PATENT OFFICE.

JOSEPH ADAMS, OF BOSTON, MASSACHUSETTS.

IMPROVEMENT IN THE CONSTRUCTION OF FLOWER POTS OR VASES FOR PLANTS, &c.

Specification forming part of Letters Patent No. 1,761, dated September 3, 1840.

*To all whom it may concern:*

Be it known that I, JOSEPH ADAMS, of Boston, in the county of Suffolk and State of Massachusetts, have invented a new and useful Improvement in Flower Pots or Vases or Vessels which usually contain earth for the reception and growth of plants.

The said improvement, the principle thereof, and manner in which I have contemplated the application of the same, by which it may be distinguished from other inventions, together with such parts or combinations as I claim as my discovery and for which I solicit Letters Patent, I have herein described and set forth, which description, taken in connection with the accompanying drawings, forms my specification.

Figures 1 and 2 represent a flower-vase with my improvement, the former being a vertical cross-section and the latter an elevation.

If the flower pot or vase is of wood, I generally prefer to line the interior with zinc or any other suitable material, as represented at $a\ b\ c\ d$, Fig. 1, in order to render it capable of holding water. Within this vase I insert a cistern, $e f g h i k l m$, Fig. 1, having a portion of the bottom, $g h i k$, formed cylindrical and of a less diameter than the part $f l$, leaving a space around the exterior of the said part $g h i k$ for containing water. One or more holes, $n$, are perforated through the sides of the part $g h i k$, communicating freely with the space around the same; and two handles, $o o$, may be attached to the upper part of the vessel $e f l m$, by which the same at any time may be removed from the vase. The earth and plant are placed in the vessel $e f l m$, and if the vase is previously partially filled with water, so as to surround the exterior of the cylinder $g h i k$, it will pass through the holes $n$ and rise through the earth by capillary attraction, and thus moisten the same and the roots of the plant, rendering it unnecessary to pour water upon the surface of the earth in the usual manner. By this arrangement it will be seen that the evaporation of the water in the vase is effectually prevented by the same being confined between the interior of the vase and the vessel $e f g h i k l m$, and that it cannot escape into the atmosphere without passing through the earth in the pot, as above suggested, and performing its intended useful effect of moistening and nourishing the roots of the plants which may be placed therein.

The vase or flower-pot, as will readily be perceived, may be constructed of any proper wood or of earthen or stone ware, or any suitable material, and may be varied in shape, according to the taste or judgment of the manufacturer.

Having thus described my improvements, I shall claim as my invention—

A cistern, $g h i k l m$, constructed as above described, and having any suitable number of holes in the bottom, in combination with a vase or flower-pot which should be partially filled with water, the whole being constructed and operating substantially in the manner and for the purposes above set forth.

In testimony that the above is a true description of my said invention and improvement I have hereto set my signature this 25th day of July, in the year of our Lord 1840.

JOSEPH ADAMS.

Witnesses:
R. H. EDDY,
EZRA LINCOLN, Jr.